United States Patent [19]

Harris et al.

[11] 4,133,786

[45] Jan. 9, 1979

[54] ACRYLATE-MODIFIED ALKYD RESIN

[75] Inventors: Robert R. Harris, Burnham; Warren J. Pollack, Carpentersville, both of Ill.

[73] Assignee: International Minerals & Chemical Corp., Libertyville, Ill.

[21] Appl. No.: 839,717

[22] Filed: Oct. 5, 1977

[51] Int. Cl.² .......................... C09D 3/66; C09D 5/02
[52] U.S. Cl. .............................. 260/22 CB; 260/23 P; 260/29.2 E; 260/32.4
[58] Field of Search .......................... 260/22 CB, 23 P

[56] References Cited

U.S. PATENT DOCUMENTS

| | | | |
|---|---|---|---|
| 3,345,313 | 10/1967 | Ruhf et al. | 260/22 M |
| 3,350,335 | 10/1967 | Silver | 260/22 CB |
| 3,374,194 | 3/1968 | Wholf | 260/22 CB |
| 3,380,942 | 4/1968 | Menke | 260/22 M |
| 3,389,104 | 6/1968 | Austin et al. | 260/22 CB |
| 3,487,034 | 12/1969 | Mallios | 260/22 M |
| 3,743,615 | 7/1973 | Yethon | 260/22 CB |
| 3,748,293 | 7/1973 | Torelli | 260/23 P |
| 3,847,851 | 11/1974 | Tugukuni et al. | 260/23 P |
| 3,894,978 | 7/1975 | Montesissa et al. | 260/22 CB |

OTHER PUBLICATIONS

Acintol–Arizona Chemical Company, 101 West 50th St., N.Y., N.Y., A-2612-8.5M-Apr.; 1962, pp. 1-21.

Primary Examiner—Ronald W. Griffin
Attorney, Agent, or Firm—Robert H. Dewey; Howard E. Post

[57] ABSTRACT

An acrylate modified alkyd resin obtained by the process consisting of the steps (a) forming an alkyd resin by reacting a conjugated fatty acid and an aromatic dicarboxylic acid or anhydride, and dimethylolpropionic acid with an excess of polyol, and (b) reacting the alkyd so formed with an alkyl-substituted or un-substituted acrylic acid or ester thereof or mixture thereof.

22 Claims, No Drawings

4,133,786

ACRYLATE-MODIFIED ALKYD RESIN

SUMMARY OF THE INVENTION

This invention relates to an acrylate-modified alkyd resin. In a particular aspect, this invention relates to a water-soluble resin having superior fast-dry properties when deposited from aqueous solution.

It is an object of this invention to provide a water-soluble acrylic-modified alkyd resin.

It is another object of this inventin to provide a water-soluble resin having improved drying characteristics when deposited from an aqueous solution.

Other objects of this invention will be apparent to those skilled in the art from the disclosure herein.

It is the discovery of this invention to provide a water-soluble, acrylic-modified alkyd resin obtained by the process consisting of the steps of (a) forming an alkyd resin having excess hydroxy groups by reacting at elevated temperatures a fatty acid having 10–20% conjugated unsaturation and an aromatic dicarboxylic acid or anhydride and dimethylolpropionic acid with a stoichiometrically excess amount of a polyol, and (b) reacting at elevated temperatures the alkyd resin so formed with an aliphatic olefinic acid or ester thereof or mixture thereof.

DETAILED DISCUSSION

In forming the alkyd resin of this invention, a conjugated unsaturated vegetable oil acid, an aromatic dicarboxylic acid or anhydride and dimethylolpropionic acid are reacted with an excess of polyol.

Vegetable oil acids suitable for use in the practice of this invention include aliphatic conjugated, unsaturated fatty acids or mixtures thereof, generally equivalent to linoleic acid in unsaturation. Preferred acids include, but are not limited so, tall oil fatty acids and linseed oil fatty acids. Both acids are well-known to those skilled in the art. Tall oil fatty acids are particularly preferred. They are derived from tall oil, which is a byproduct of the paper industry. Also, blends of dehydrated castor and soybean oil or a blend of tung oil fatty acids and soybean fatty acids having equivalent conjugated unsaturation can be used.

The amount of vegetable oil acid used is generally from about 18–35% by weight, preferably 18–25% based on total ingredients; 19–21% is particularly preferred. Although tall oil fatty acids are preferred for the practice of this invention, linseed fatty acids or linoleic acid can also be used.

Suitable aromatic dicarboxylic acids or anhydrides thereof include isophthalic acid and tetrahydrophthalic acid or anhydride, but the preferred acid is phthalic anhydride. The amount of aromatic dicarboxylic acid can vary from about 10–20% of total ingredients, preferably about 12–17%; 14–15% is particularly preferred.

Dimethylolpropionic acid is known in the art and is commercially available. The usual commercial grade is suitable for the practice of this invention. It is used in amounts of about 2–4%, but 2.25–3.5% is preferred, and 2.5–3.0% is particularly preferred.

The polyols suitable for the practice of this invention include those polyhydric alcohols having more than two hydroxy groups per molecule, of which there are many known in the art, such as glycerol, pentaerythritol, trimethylolethane, trimethylolpropane and the like. The amount of polyol used is the equivalent of from about 9–12% of trimethylolethane, which is the preferred polyol, or preferably from about 10–11%.

The alkyd portion of the resin is prepared by charging the above ingredients along with about 1–2% of reflux solvent e.g. an aromatic hydrocarbon, e.g. toluene, xylene, or ethyl benzene, or a ketone such as methylpropyl ketone, methyl isobutyl ketone or methyl-n-butyl ketone, preferably xylene, to a reaction vessel and after mixing well, the ingredients are heated to about 210–215° C. while removing water of reaction until an acid value of 38 ± 2 is reached. At this point there are still unreacted hydroxy groups present.

The reaction mixture is allowed to cool to about 138° C. and about 5% of additional ketone or aromatic hydrocarbon, preferably ethyl benzene, is added. The reaction mixture is well mixed and then a mixture of an aliphatic olefinic acid, preferably methacrylic acid, and substituted or unsubstituted acrylic ester, preferably methyl methacrylate, is added over a period of about five hours while holding the temperature at about 138° C. Methacrylic acid is used in an amount of about 2–4%, preferably 2.25–3.5% and 2.5–3.0% is preferred. When acrylic acid or other substituted acrylic acid is used, the amount is selected on an equi-molar basis to the methacrylic acid. Methyl methacrylate is used in an amount of about 15–25%, preferably about 19–21%. Other acrylic esters, such as methyl acrylate, ethyl acrylate, or ethyl methacrylate can be substituted for methyl methacrylate when desired.

Preferably, a polymerization catalyst is employed in the mixture. Any catalyst known in the art can be used, the catalyst not being regarded as a part of the invention. Ditertiary butyl peroxide is a preferred catalyst and is used in an amount of about 0.7 to 0.9%. After all the acrylic monomers have been added, the mixture is heated for about another two hours at about 138° C., then the temperature is raised to about 155° C. for about an hour for complete conversion. When the reaction is complete, the acid value is about 45–50 and the Gardner viscosity is $Z_5$ to $Z_7$. The mixture is then cooled to about 138° C. and mono-alkyl ether of ethylene glycol, e.g. the ethyl or butyl mono-ether, about 17–18%, and n- or isobutyl alcohol, 5–6%, is added. When cool the mixture is ready for use.

For use, the resin is neutralized with ammonia or an amine, as is known in the art. Any of the known methods for neutralizing an acid resin can be used. Such a step is not considered as a part of the present invention.

The acrylic modified alkyed resin of this invention has particular utility as a fast, air-dry, water-soluble vehicle in high gloss enamels intended for topcoats. It is especially useful in white and light-colored enamels intended for application on implements.

The invention will be better understood with reference to the following examples. It is understood, however, that the examples are intended only to illustrate the invention and that it is not intended that the invention be limited thereby.

EXAMPLE 1

To a reaction kettle equipped with a heat source, a cooling source, an agitator, a reflux condenser with a takeoff head and temperature-sensing means was added 1804 lb of tall oil fatty acids, 1433 lb of phthalic anhydride, 1048 lb of trimethylolethane and 280 lb of dimethylolpropionic acid and 100 gallons of xylene.

The mixture was heated slowly with agitation to 210° C. and this temperature was maintained while removing water of reaction as the xylene azeotrope through the take-off head until the acid value was about 38. The mixture was then cooled rapidly to 160° C. and 67 gallons of ethyl benzene was added.

The mixture was further cooled to 138° C. and a mixture of methyl methacrylate 1955 lb, methacrylic acid 262 lb and ditertiary butyl peroxide 77 lb was slowly added over a five hour period. After all the mixture was added, it was heated an additional two hours at 138° C., then the temperature was increased to 155° C. for one hour to complete the reaction.

At the end of the heating period, the temperature was reduced to 138° C. and ethylene glycol monobutyl ether 1489 lb (200 gallons) was added. This was followed by isobutyl alcohol 558 lb (83 gallons). The product was allowed to cool, then was discharged from the kettle. The viscosity was Gardner $Z_6+$, the color 5+, acid value 49.8 and the product was clear, free from suspended matter. The total nonvolatile component was 69.1%.

When neutralized with ammonia and diluted with water to 40% solids, a 2 mil wet film at 25° C. and 50% relative humidity will set to touch in ten minutes, set to cotton in fifteen minutes and become tack-free in 45 minutes (Zapon test, 500 g).

A gloss white, water-soluble enamel was prepared from the resin in accordance with the following recipe:
Resin solution — 160.9 lb
Ethylene glycol monobutyl ether — 30.0 lb
n-Butanol — 10.0 lb
26° Ammonium hydroxide — 6.5 lb
Water — 256.5 lb
6% Cobalt naphthenate — 1.9 lb
12% Zirconium naphthenate — 0.47 lb
Titanium dioxide — 200.0 lb The above mixture was dispersed to a fineness of 7.5 N.B.S. units and the following ingredients were added
Resin solution — 160.9 lb
Ethylene glycol monobutyl ether — 30.0 lb
n-Butanol — 10.0 lb
26° Ammonium hydroxide — 6.5 lb
Water — 171.5 lb
Surface control agent — 0.6 lb The resulting product had a pH of 8.30.

EXAMPLE 2

The experiment of Example 1 is repeated in all essential details except that linoleic acid is substituted for tall oil fatty acids. There is obtained an acrylic-modified alkyd resin having fast dry properties.

EXAMPLE 3

The experiment of Example 1 is repeated in all essential details except that linseed oil fatty acids are substituted for tall oil fatty acids. There is obtained an acrylic-modified alkyd resin having fast dry properties.

EXAMPLE 4

The experiment of Example 1 is repeated in all essential details except that a blend of dehydrated castor oil and soybean fatty acids having 15% conjugated unsaturation is substituted for tall oil fatty acids. There is obtained an acrylic-modified alkyd resin having fast dry properties.

EXAMPLE 5

The experiment of Example 1 is repeated in all essential details except that a blend of tung oil and soybean fatty acids having 12% conjugated unsaturation is substituted for tall oil fatty acids. There is obtained an acrylic-modified alkyd resin having fast dry properties.

EXAMPLE 6

The experiment of Example 1 is repeated in all essential details except that an equivalent amount of glycerol is substituted for trimethylolethane. There is obtained an acrylic-modified alkyd resin having fast dry properties.

EXAMPLE 7

The experiment of Example 1 is repeated in all essential details except that an equivalent amount of pentaerythritol is substituted for trimethylolethane. There is obtained an acrylic-modified alkyd resin having fast dry properties.

EXAMPLE 8

The experiment of Example 1 is repeated in all essential details except that an equivalent amount of trimethylolpropane is substituted for trimethylolethane. There is obtained an acrylic-modified alkyd resin having fast dry properties.

EXAMPLE 9

The experiment of Example 1 is repeated in all essential details except that acrylic acid is substituted for methacrylic acid and ethyl acrylate is substituted for methyl methacrylate. There is obtained an acrylic-modified alkyd having fast dry properties.

We claim:
1. An ammonia neutralized aqueous dispersion of a water-soluble acrylic-modified alkyd resin, said resin obtained by the process consisting of the steps of (a) forming an alkyd resin having excess hydroxy groups by reacting at elevated temperatures a fatty acid having 10–20% conjugated unsaturation and an aromatic dicarboxylic acid or anhydride and dimethylolpropionic acid with an excess amount of a polyol, and (b) reacting at elevated temperatures the alkyd resin so formed with acrylic or methacrylic acid or ester thereof or mixture thereof.

2. The resin of claim 1 wherein the fatty acid is tall oil fatty acids, linseed oil fatty acids, a blend of dehydrated caster oil and soybean oil fatty acids, a blend of tung oil fatty acids and soybean oil fatty acids, or linolenic acid.

3. The resin of claim 2 wherein the fatty acid is tall oil fatty acid.

4. The resin of claim 2 wherein the fatty acid is linseed oil fatty acid.

5. The resin of claim 2 wherein the fatty acid is a blend of dehydrated castor oil and soybean oil fatty acids.

6. The resin of claim 2 wherein the fatty acid is a blend of tung oil fatty acids and soybean oil fatty acids.

7. The resin of claim 2 wherein the fatty acid is linolenic acid.

8. The resin of claim 1 wherein the aromatic dicarboxylic acid or anhydride thereof is o-phthalic acid, isophthalic acid or tetrahydrophthalic acid.

9. The resin of claim 8 wherein the dicarboxylic acid is o-phthalic acid.

10. The resin of claim 8 wherein the dicarboxylic acid is iso-phthalic acid.

11. The resin of claim 8 wherein the dicarboxylic acid is tetrahydrophthalic acid.

12. The resin of claim 1 wherein the polyol is glycerol, pentaerythritol, trimethylolethane, or trimethylolpropane.

13. The resin of claim 12 wherein the polyol is glycerol.

14. The resin of claim 12 wherein the polyol is pentaerythritol.

15. The resin of claim 12 wherein the polyol is trimethylolethane.

16. The resin of claim 12 wherein the polyol is trimethylolpropane.

17. The resin of claim 1 wherein the acid of step (b) is acrylic acid.

18. The resin of claim 1 wherein the acid of step (b) is methacrylic acid.

19. The resin of claim 1 wherein the ester of step (b) is methyl methacrylate, ethyl methacrylate, methyl acrylate or ethyl acrylate.

20. The resin of claim 1 wherein the alkyd resin portion is formed by heating the acids and polyols at about 210–215° C. for a period of time sufficient to provide an acid value of about 38.

21. The resin of claim 1 wherein the alkyd resin is reacted with the olefinic acid and olefinic acid ester by heating at about 138–155° C. for a period of time sufficient to provide an acid value of about 45–50 and a viscosity of about $Z_5$ to $Z_7$.

22. A process for forming a water-soluble acrylic-modified resin comprising the steps of (a) forming an alkyd resin having excess hydroxy groups by reacting at elevated temperatures a fatty acid having 10–20% conjugated unsaturation with an aromatic dicarboxylic acid or anhydride and dimethylolpropionic acid with an excess amount of a polyol, and (b) reacting at elevated temperatures the alkyd resin so formed with an aliphatic olefinic acid or ester thereof or mixture thereof and neutralizing with ammonia or an amine.

* * * * *

UNITED STATES PATENT AND TRADEMARK OFFICE
CERTIFICATE OF CORRECTION

PATENT NO. : 4,133,786
DATED : January 9, 1979
INVENTOR(S) : Robert R. Harris and Warren J. Pollack It is certified that error appears in the above-identified patent and that said Letters Patent are hereby corrected as shown below:

Column 1, line 11, "inventin" should read -- invention --

Column 1, line 38, "so" should read -- to --

Column 4, line 48, "linolenic" should read -- linoleic --

Column 4, lines 58-59, "linolenic" should read -- linoleic --

Signed and Sealed this

Fifth Day of June 1979

[SEAL]

Attest:

RUTH C. MASON
Attesting Officer

DONALD W. BANNER
Commissioner of Patents and Trademarks